United States Patent
Weng et al.

(10) Patent No.: US 7,865,356 B2
(45) Date of Patent: Jan. 4, 2011

(54) METHOD AND APPARATUS FOR PROVIDING PROPER OR PARTIAL PROPER NAME RECOGNITION

(75) Inventors: Fuliang Weng, Mountain View, CA (US); Lin Zhao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 568 days.

(21) Appl. No.: 10/892,724

(22) Filed: Jul. 15, 2004

(65) Prior Publication Data

US 2006/0015484 A1  Jan. 19, 2006

(51) Int. Cl.
G06F 17/27 (2006.01)

(52) U.S. Cl. .................................. 704/9; 704/1; 704/10

(58) Field of Classification Search ........................ None
See application file for complete search history.

(56) References Cited

U.S. PATENT DOCUMENTS

| | | | | | |
|---|---|---|---|---|---|
| 4,965,763 | A | * | 10/1990 | Zamora | 704/1 |
| 6,052,682 | A | * | 4/2000 | Miller et al. | 707/3 |
| 6,311,152 | B1 | * | 10/2001 | Bai et al. | 704/9 |
| 2002/0031269 | A1 | * | 3/2002 | Fukushima | 382/228 |
| 2003/0191625 | A1 | * | 10/2003 | Gorin et al. | 704/1 |
| 2005/0234906 | A1 | * | 10/2005 | Ganti et al. | 707/5 |

OTHER PUBLICATIONS

A Maximum Entropy Approach to Named Entity Recognition http://cs.nyu.edu/cs/projects/proteus/publication/papers/borthwick_thesis.ps Andrew Borthwick Sep. 1999.*
Zhou et al., "A Fast Algorithm for Feature Selection in Conditional Maximum Entropy Modeling," Proceeding of CoNNL-2002, Taipe.
Ronald Rosenfeld, "Adaptive Statistical Language Modeling: A Maximum Entropy Approach," School of Computer Science, Carnegie Mellon University, PA, Apr. 19, 1994, CMU-CS-94-I38.
Wu et al., "A Stacked, Voted, Stacked Model for Named Entity Recognition," Proceedings of CoNNL-2003 Edmonton.
Tjong Kim Sang et al., "Introduction to the CoNLL-2003 Shared Task: Language-Independent Named Entity Recognition," Proceedings of CoNNL-2003 Edmonton.
De Meulder et al., "Memory-Based Named Entity Recognition using Unannotated Data," Proceedings of CoNN-2003 Edmonton.
Hendricks et al., "Memory-based one-step named-entity recognition: Effects of seed list features, classifier stacking, and unannotated data," Proceedings of CoNNL-2003 Edmonton.
Nancy A. Chinchor, "Overview of MUC-7/MET-2," Message Understanding Proceedings MUC-7. San Diego, 2001.
Lee, KJ. et al., "Two-Phase Biomedical NE Recognition Based on SVMs", Dep. of Computer Science & Engineering, Korea University, 2003, pp. 33-40.
Kinoshita S. et al., "Entity Identification in the Molecular Biology Domain with a Stochastic POS Tagger: the BioCreative Task", BioCreative Workshop: A critical Assessment of Text Mining Methods in Molecular Biology, Mar. 2004.

(Continued)

*Primary Examiner*—Pierre M Vital
*Assistant Examiner*—Christopher J Raab
(74) *Attorney, Agent, or Firm*—Kenyon & Kenyon LLP (57) ABSTRACT

A method of proper name recognition includes classifying each word of a word string with a tag indicating a proper name entity category or a non-named entity category, and correcting the tag of a boundary word of the word string.

20 Claims, 7 Drawing Sheets

OTHER PUBLICATIONS

Langlais P. et al., "Merging Example-Based and Statistical Machine Translation: An Experiment", Proceedings of the 5$^{th}$ Conference of the Association for Machine Translation in the Americas, 2002, pp. 104-113.

Zhou G. et al., "Recognizing Names in Biomedical Texts: A Machine Learning Approach", Bioinformatics, vol. 20, No. 7, 2004, pp. 1178-1190.

Daelemans W. et al., "Memory-Based Shallow Parsing", Proceeding of CONLL-99, Jun. 12, 1999.

Curran Jr. et al., "Language Independent NER Using a Maximum Entropy Tagger", Human Language Technology Conference Proceedings of the 7$^{th}$ Conference on Natural Language Learning, 2003, pp. 164-167.

European Search Report, Mar. 20, 2007, from European Patent Application No. 05012950.1-1527.

* cited by examiner

METHOD AND APPARATUS FOR PROVIDING PROPER OR PARTIAL PROPER NAME RECOGNITION

FIELD OF THE INVENTION

The present invention relates to a method and apparatus for providing proper or partial proper name recognition.

BACKGROUND INFORMATION

Earlier named entity (NE) recognition approaches involved information extraction programs developed by the Defense Advanced Research Projects Agency (DARPA). In this regard, seven named entity categories were defined in the DARPA benchmarks, including the named entity categories of person, organization, location, time, date, money, and percent. Other researchers continued this direction of work but with only the four named entity types of person, organization, location, and misc (See, e.g., Erik F. Tjong Kim Sang and Fien De Meulder, Introduction to the CoNLL-2003 Shared Task: Language-Independent Named Entity Recognition, Proceedings of CoNLL-2003, Edmonton, 2003). While these named entity categories may be useful in certain applications, other named categories may be useful as well, including, for example, such named entity categories as product names, book names, song names, etc. Also, people do not always spell out names fully. In spoken language dialog applications, for example, partial names may be used to refer to their corresponding entities when the names are long. In contrast with the full name recognition, much less attention has been given to the task of partial name recognition.

Past work in the field of proper name recognition may have been focused on less complicated proper names, i.e., names without internal structure. Song and album names, and possibly other names such as book titles, may pose a special challenge to the recognition task. Researchers have tried to use proper name lists/databases to improve the performance of their methods. However, the results were mixed, with some reporting small improvement in certain instances (Andrei Mikheev, Claire Grover, and Marc Moens, Description of the LTG System Used for MUC-7, Proceedings of MUC-7, 1998), while others reported degradation in performance (Iris Hendrickx and Antal van den Bosch, Memory-based one-step named-entity recognition: Effects of seed list features, classifier stacking, and unannotated data, Proceedings of CoNLL-2003, Edmonton, Canada 2003; Dien De Meulder and Walter Daelemans, Memory-based Named Entity Recognition using Unannotated Data, Proceedings of CoNLL-2003, Edmonton, Canada 2003).

SUMMARY OF THE INVENTION

An exemplary embodiment and/or exemplary method or apparatus of the present invention provides proper name recognition using at least one method of named entity (NE) recognition as a baseline followed by a boundary correction method. The at least one baseline method of NE recognition may include, for example, the memory-based learning method and/or the maximum entropy (ME) based method. The at least one baseline method of NE recognition may also include, for example, the hidden Markov model (HMM) method and the decision tree method.

The performance of the two baseline methods has been measured, using, for example, the two named entity categories of song and album names. When an exemplary boundary-correction method is combined with the two baseline methods, significant improvements have been observed with error rates cut into half and f-scores reaching above 95%.

An exemplary embodiment and/or exemplary method or apparatus of the present invention may provide proper name recognition using a baseline named entity classifier followed by a rule-based named entity classifier, such as, for example, the transformation-based learning classifier. In this regard, the accuracy of proper name recognition may be increased and tagging errors may be reduced.

An exemplary embodiment and/or exemplary method or apparatus of the present invention may be applied, for example, in spoken dialog systems and information extraction programs. In particular, the exemplary embodiment and/or exemplary method or apparatus may be applied in high-stress environments, such as may be experienced when driving a vehicle, where drivers may tend to use short-hand names rather than full proper names. Consequently, the spoken dialog systems and/or information extraction programs may be improved.

DETAILED DESCRIPTION

An exemplary method for proper or partial proper name recognition includes a memory-based learning method and/or maximum entropy based method combined with a boundary correction method, as described below. The input is a string of words associated with part of speech (POS) tags.

The Memory-Based Method

Named Entity (NE) recognition may be considered as a classification problem, in which the memory-based learning method is used as a baseline classifier. According to an exemplary memory-based learning method for NE recognition, instances are represented with features and each feature is assigned a weight based on its contribution to the classification accuracy in the training data. During the training stage, the exemplary memory-based learning method stores all training instances in the form of features, and classifies new instances by comparing them with the training instances. A new instance will receive the same class as those training instances that are most similar to the new instance according to a predefined similarity metric. The reference by Dien De Meulder and Walter Daelemans, which is Memory-based Named Entity Recognition using Unannotated Data, Proceedings of CoNLL-2003, Edmonton, Canada, 2003, discusses an exemplary memory-based learning package called "Timbl", which was used to perform the experiments described herein. In this regard, the "IGTree" setting and the information gain were used as a feature weighting. All the other parameters used the default values.

The purpose of the classifier is to label each token with either a proper NE category or a non-NE category. Here, only two NE categories were considered in the context of spoken language understanding for the domain of operating an MP3 player: song names and album names. This is because the two categories may be difficult to deal with due to, for example, the variety of ways in which song and album names may be composed. In particular, the two categories may be difficult to deal with since any word, phrase, or sentence may potentially be part of a song or album name.

The tag set used for the classifier includes three types of tags: "I", "O", and "B" tags, where "I" indicates that a word is inside a NE category, "O" indicates that a word is a non-NE category, and "B" indicates the start of a new NE category immediately after a NE of the same category.

The input features to the memory-based classifier include the current word or Part of Speech (POS) tag and its left context (including words, POS tags and identified NE tags) with a window size of 3, so altogether 10 features. Since features used frequently in normal NE tasks, such as affix and orthographic information, do not occur in spoken language, they are not considered here. The feature representation for each word and its corresponding NE category will be stored in a training procedure. For a new input sentence with POS tags, each word is represented by the above ten-dimensional features and assigned the same category as that of its nearest neighbor in the training set.

The Maximum Entropy Method

Maximum entropy (ME) based methods have been used in a number of works, as reported for example, by Erik F. Tjong Kim Sang and Fien De Meulder, in the reference of Introduction to the CoNLL-2003 Shared Task: Language-Independent Named Entity Recognition, Proceedings of CoNLL-2003, Edmonton, Canada 2003. The ME-based methods treat proper name recognition as a tagging problem, and use maximum entropy modeling to estimate the conditional probability of the IOB tag of the current word, given its history. Using chain rule, the best IOB tag sequence may be determined as:

$$\hat{E}_1^n = \arg \max_{E_1^n} \{ P(E_1^n \mid W_1^n, T_1^n) \}$$

$$\text{where } P(E_1^n \mid W_1^n, T_1^n) = \prod_i P(E_i \mid E_1^{i-1} W_1^i, T_1^i),$$

$E_1^n$, $W_1^n$, and $T_1^n$ are the IOB tag, word, and POS tag sequences, respectively.

Since it may not always be possible to model the whole past history, the left three words and their tags may be used as the history. If "x" is used for history and "y" is used for IOB tags, the conditional maximum entropy modeling may be computed as determined with the following formula:

$$p(y|x) = \frac{1}{Z(x)} \exp \left\{ \sum_j \lambda_j f_j(x, y) \right\}$$

-continued where $Z(x) = \sum_y \exp \left\{ \sum_j \lambda_j f_j(x, y) \right\}$ is a normalization factor.

To train the conditional maximum entropy model, a selective gain computation (SGC) method may be used for providing feature selection and parameter estimation, which is described, for example, in co-pending U.S. patent application Ser. No. 10/613,366, entitled "A Fast Feature Selection Method and System for Maximum Entropy Modeling", which was filed Jul. 3, 2003, the disclosure of which is incorporated by reference herein in its entirety. As discussed therein, the conditional maximum entropy estimated probability is computed or determined using fast feature selection. A set of feature templates may be provided for providing the training. In particular, word, POS tag, and IOB tag of the left three positions, as well as word and tag information of the current position, may be used in combination in the templates.

The Boundary Correction Method

The tagging results that are returned by the baseline tagging methods, such as the memory-based learning method and the maximum entropy (ME) based method, may contain errors at the boundaries of proper names. For example, in the sentence "I want to listen to the album that love tomorrow is on", the member words of song name "love tomorrow" may be incorrectly tagged as "love/I-songname tomorrow/O", instead of the correct one: "love/I-songname tomorrow/I-songname". To recognize partial proper names may be even more challenging. In various practical applications, especially in spoken language applications, people may use only partial names instead of full names when the names are long and the references are not very contextually ambiguous. Since in various applications, proper names are known to the system (e.g., as part of a database), such information may be used to solve the above problems together. In this regard, the proper names recognized by the baseline methods maybe checked against a given name database and the ones in the database that match well with the recognized names are used to correct potential errors in the recognized names, especially at the boundaries of the recognized names.

For better understanding of the exemplary boundary correction method, a concrete example is presented: Consider a sentence . . . WABCD . . . (where each character represents a word), where ABCD is a partial song name and W is outside of that name. If the proper name is incorrectly tagged as "W/I-songname A/I-songname B/I-songname C/I-songname D/O" by the baseline classifier, an exemplary boundary correction method may use WABC to search the database and eventually remove W from this song name and recognize D as a part of this name.

Figure 1A:
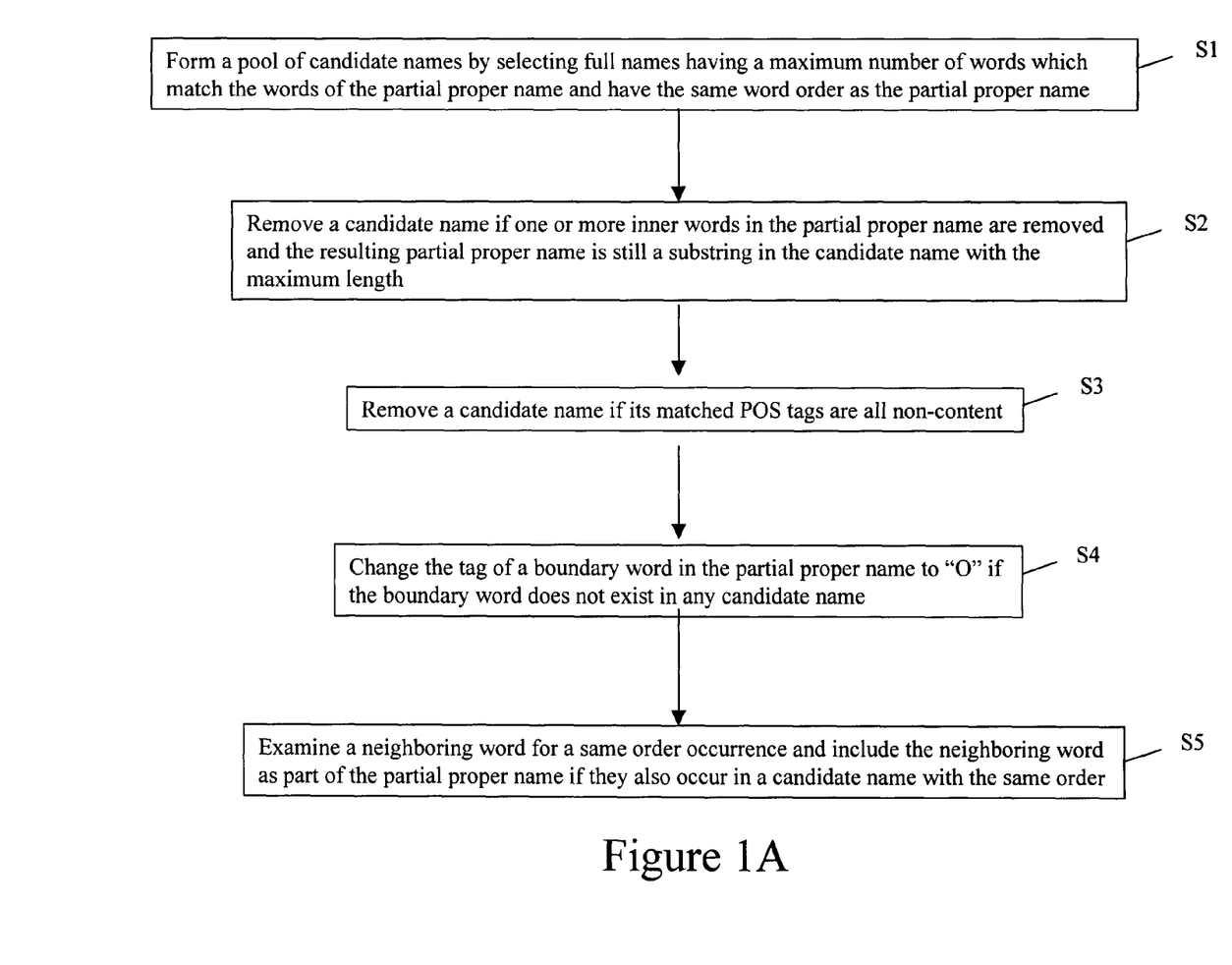
FIG. 1A shows an exemplary boundary correction method for providing proper or partial proper name recognition.

FIG. 1A shows an exemplary boundary correction method 100 according to the exemplary method of the present invention. Given a recognized partial proper name, the exemplary boundary correction method 100 includes the following operations or steps:

In step S1, a pool of candidate names is formed by selecting from a full name database those full names that have the maximum number of words occurring in the partial name and in which the order of the matched words is the same as that of the partial name. In the above example of partial name WABC, the system may select, for example, ABCDE, WABE and WACE, because all of the three names have three words in common with WABC and the three words are in the same order as the corresponding ones in the partial proper name.

In step S2, if one or more inner words in the partial proper name are removed and the resulting partial proper name is still a substring in the full name with the maximum length, then the full name is removed from the candidate pool. For example, given the partial name WABC and a full name WACE, removing B in the partial name leads to a subsequence WAC, which is the maximum subsequence in the full name WACE. Therefore, the full name WACE is removed. That is, non-boundary insertion is not allowed for the partial name.

In step S3, unless all the POS tags in the full name are non-content words, a candidate name is removed from the pool if its matched POS tags are all non-content. This is because if there is a content word, it may be more likely that it would occur in the partial name.

In step S4, if a boundary word in the partial name does not exist in the full name pool, the system changes its tag from proper name category to 'O'. Otherwise, it is kept unchanged. In the above example, if W is not in the full name, the tag for W will be changed to 'O', and consequently, WABC will be tagged as W/O A/I-songname B/I-songname C/I-songname.

In step S5, the neighboring words of the partial proper name in the sentence are examined to determine whether they can be part of the proper name. If a neighboring word occurs in a full name and with the same order, it is assigned to the same proper name category. For example, if the right neighboring word of ABC is D which occurs in the full name ABCDE, in the final step of the exemplary boundary correction method, sentence WABCD is correctly tagged as W/O A/I-songname B/I-songname C/I-songname D/I-songname.

Figure 1B:
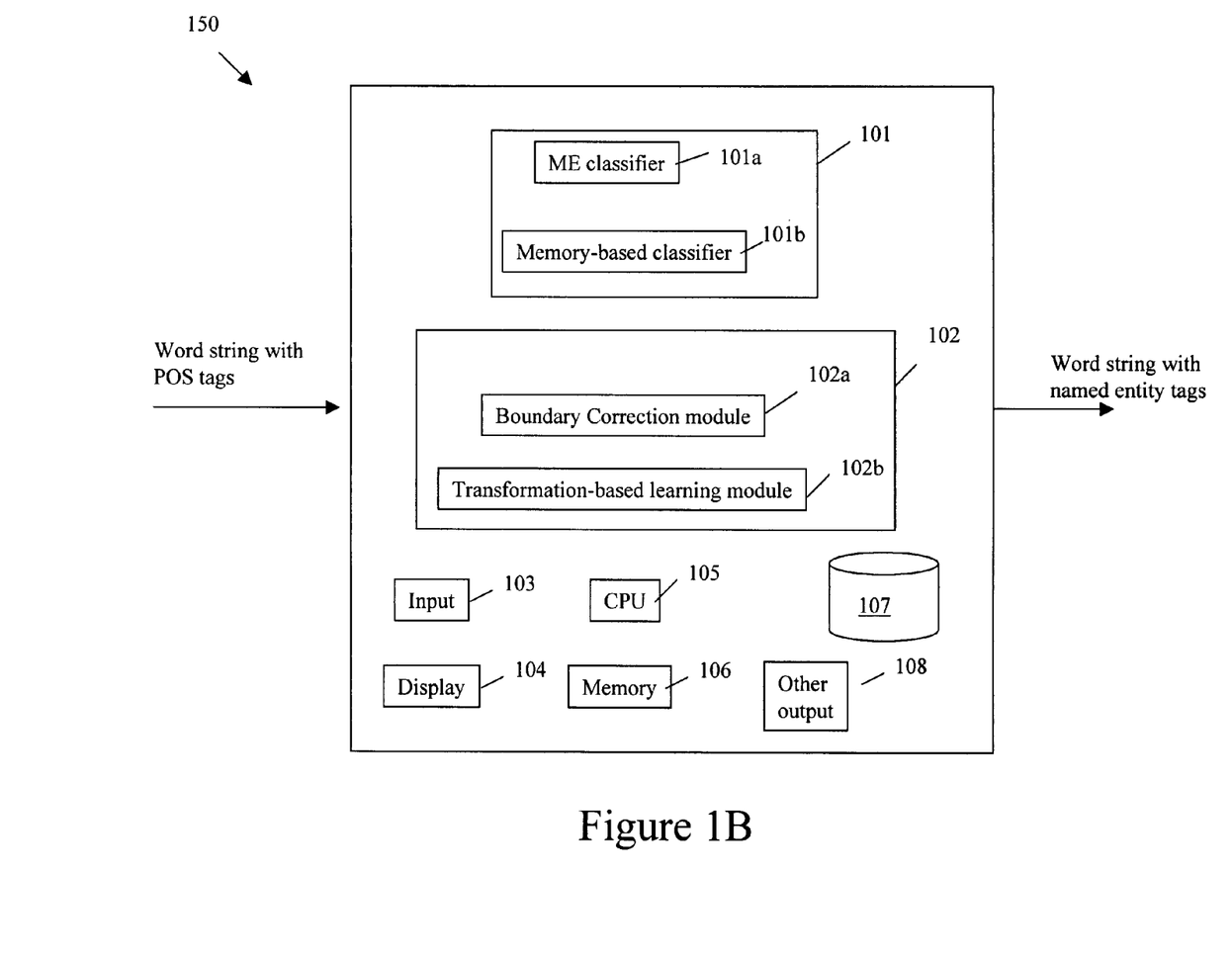
FIG. 1B shows an exemplary system/apparatus for providing proper or partial proper name recognition.

FIG. 1B shows an exemplary system 150 for providing proper name recognition, which classifies each word of an inputted word string with a named entity tag (e.g., IOB tag) and corrects the named entity tag of a word of the word string, using the exemplary method described herein. The exemplary system 150 includes a baseline classifier 101, a correction module 102, an input arrangement 103 (which may be, for example, a keyboard, voice input or stylus), a display arrangement 104, a CPU or processing arrangement 105, a memory 106, a database 107 of full names, and an output arrangement 108 (which may be, for example, a display printer or voice arrangement). The baseline classifier 101 and the correction module 102 may be implemented, for example, as a set of instructions to be executed by the central processing unit (CPU) 105, which are stored in the memory or firmware. The baseline classifier 101 includes a memory-based learning classifier 101a and a maximum entropy based classifier 101b. The correction module 102 includes a boundary correction module 102a and a transformation-based learning module 102b. The system 150 may be implemented using a server arrangement to provide a network or Internet based application.

The experiments below show that after the exemplary boundary correction method is applied, most of the errors, especially boundary errors, may be corrected.

Experiments

A set of experiments was performed to assess the effectiveness of the exemplary boundary correction method. Operating MP3 players were selected as the test domain and highly complicated song names and album names as the categories for testing the method. Simulated training and testing data sets by permuting all the song and album names were used due to the lack of real data. Compared with the memory-based method and ME-based method, the addition of an exemplary boundary-correction method cuts the error rates in half.

The Wall Street Journal (WSJ) tag set was used as the Part of Speech (POS) tag set and more than 700 template sentences in the domain of operating a MP3 player were collected. A template sentence is a sentence with proper names replaced with their class tags. So, in the MP3 domain, songname is used as the class tag for all the song names, albumname is used as the class tag for album names, and so on. These two categories were focused on because they are believed to be more dynamic and complex than the artist names and genre names. In addition to the template sentences, about 300 song names and about 30 album names were used in the experiments. The partial proper names were derived by removing the non-content words in the names. For the song names, the average length of the full names is 3, while the average length of the partial names is 1.88. 63% of the partial song names are different from their full name counterpart. For the album names, the average length of the full names is 2.68, while the average length of the partial name is 1.93. 54% of partial album names are different from their full name counterpart. These song and album names are permuted in the template sentences to generate 28577 synthesized sentences in the experiments.

The first set of experiments demonstrates the effect of different amounts of training and testing data. The 700 template sentences were divided into 4 subsets, 8 subsets, and 10 subsets. In the case of 4 subsets, for each experiment, 3 subsets were used as the training data, and the other subset was used as the test data. In this manner, each subset was used as a test set once, and in total, four experiments were conducted. The results in the case of 4 subsets are summarized in FIG. 2. It is similar for cases when there are 8 subsets and 10 subsets, and their results are provided in FIGS. 3 and 4, respectively. To see the effect of the exemplary boundary correction method, the same song name and album name sets are used for generating both training and testing data. The only difference between the names (song and album) used for training and the names for testing is that non-content words in the names were removed to "fake" partial proper names for the test data. For that reason, the same set of experiments were conducted without step S3 in the exemplary boundary correction method. The generation of the training and test data sets may not be required if a sufficiently large amount of real training and testing data are available.

Figure 2:
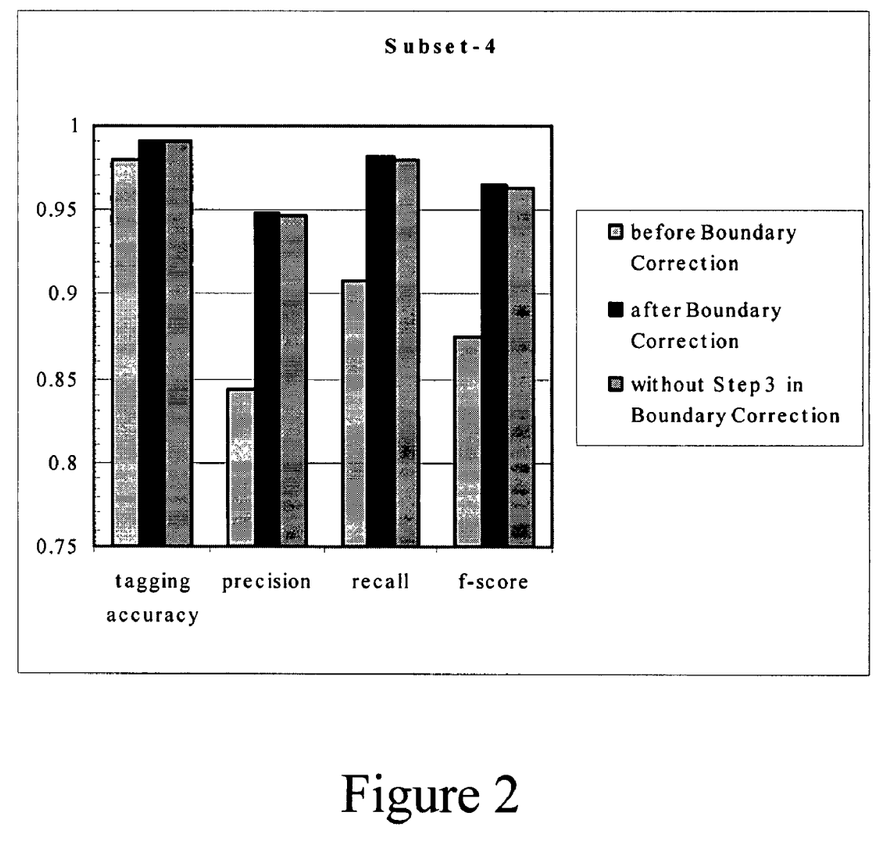
FIG. 2 shows exemplary average test results for a subset-4 using the memory-based learning method before and after an exemplary boundary correction method was added.

In the case of a 4-fold partition, the sizes of the training sets are between 19757 sentences (171990 words) to 23292 sentences (198799 words), and the size of the test sets are between 5285 sentences (41131 words) and 8820 sentences (63362 words). For the experiments, IOB tagging accuracy, the recall, precision and f-score of the proper name recognition are determined or computed. The results of the 4 tests are averaged based on the sizes of the 4 test sets. FIG. 2 shows that the tagging accuracy reaches 98% for the memory-based method, and with the addition of the exemplary boundary correction method, the combined method reaches 99%. The improvement of the numbers for precision, recall and subsequently f-score are more drastic with the addition of the exemplary boundary correction method. Precision improves from 84.33% to 94.92%, recall improves from 90.81% to 98.16%, and f-score improves from 87.45% to 96.51%. In other words, the addition of the exemplary boundary correction method cuts the error rates by more than 50% in all the cases. Also, the numbers without step S3 in the exemplary boundary correction method maintain a high level of performance with only a slight degradation.

Figure 3:
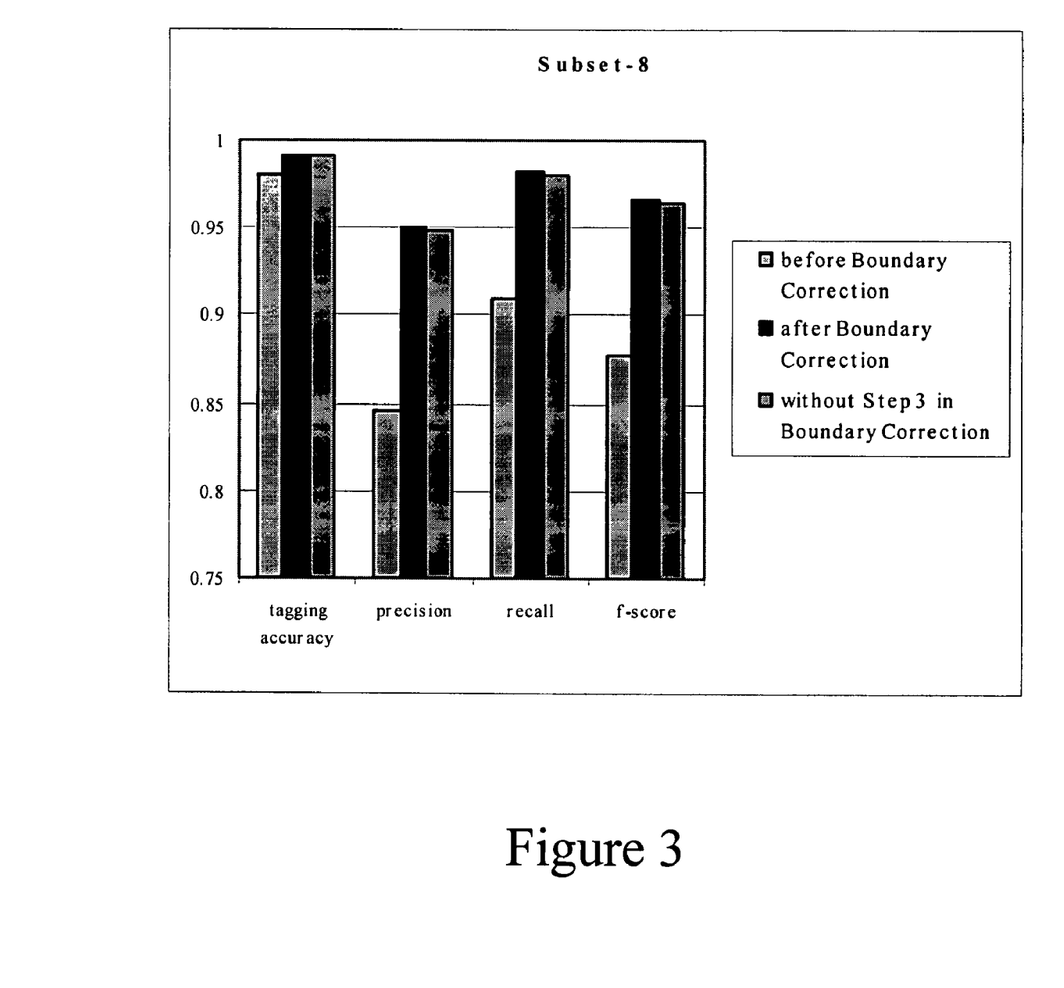
FIG. 3 shows exemplary average test results for a subset-8 using the memory-based learning method before and after an exemplary boundary correction method was added.
Figure 4:
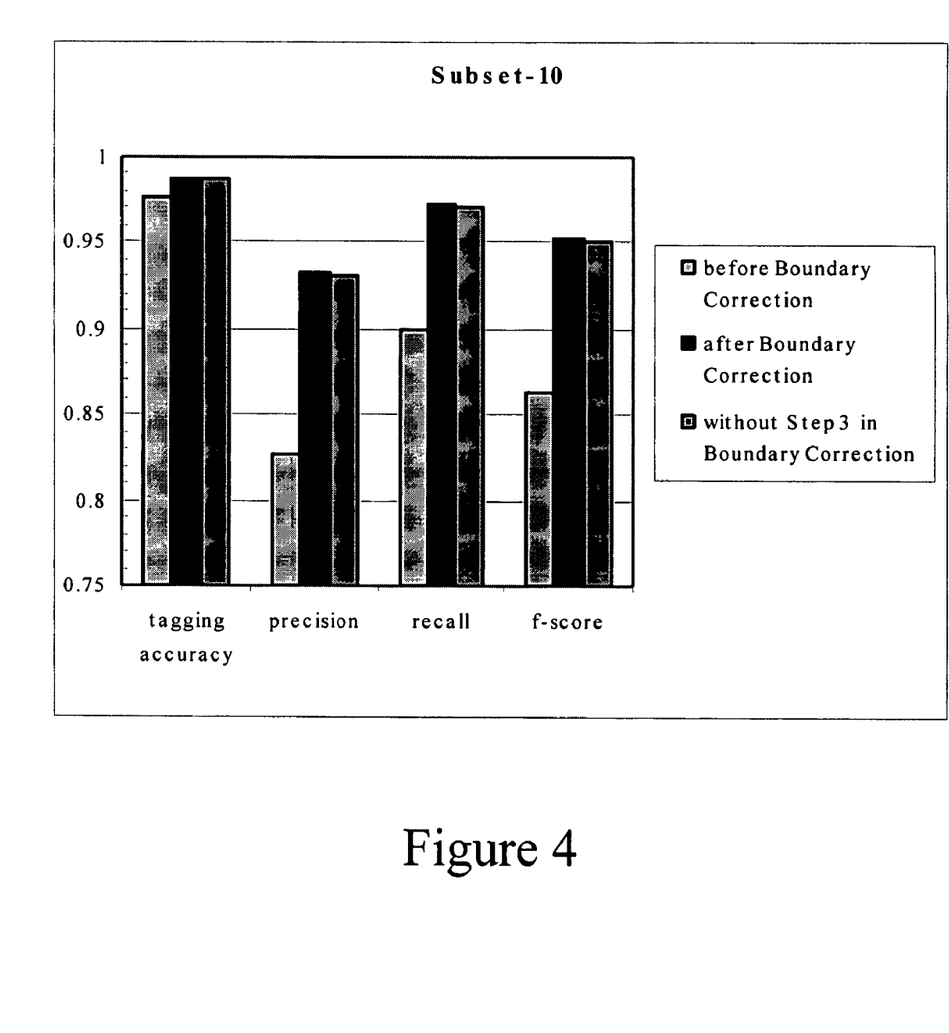
FIG. 4 shows exemplary average test results for a subset-10 using the memory-based learning method before and after an exemplary boundary correction method was added.

The results from 8-subsets and 10-subsets show similar patterns as the case of 4-subsets (see, for example, FIGS. 3 and 4). However, the results from the 8-subsets are better than the ones from 4-subsets. This may be the result of using more training data in the experiments.

Figure 5:
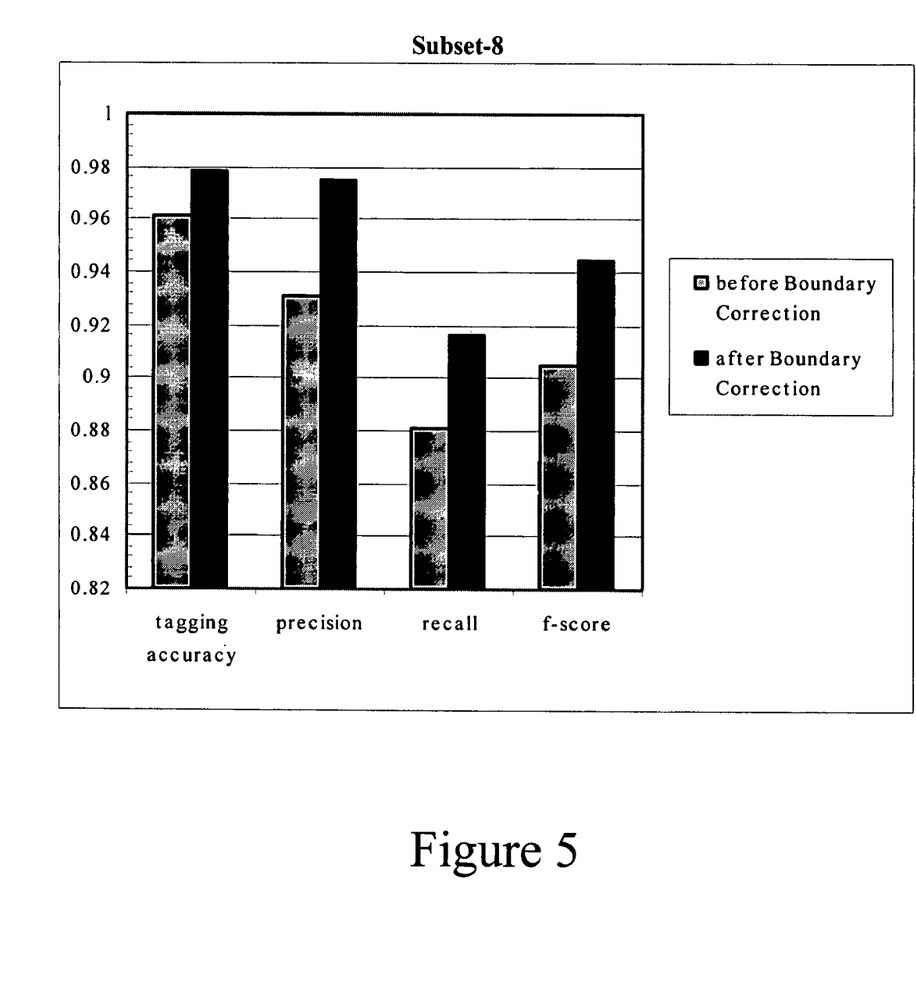
FIG. 5 shows exemplary average test results for a subset-8 using the maximum entropy based method before and after an exemplary boundary correction method was added.

To determine whether the exemplary boundary correction method has added values to other methods for partial proper name recognition, another set of experiments was conducted with the maximum entropy based method. Similarly, 8-subsets were used for the experiments, in round-robin fashion. The results are averaged across 8 different test sets. The performance of the maximum entropy based method combined with the exemplary boundary-correction method may be somewhat less than if the exemplary boundary correction method were combined with the memory based baseline approach. This may be partly because we used 6 subsets as the training data, one subset as the development set, and the last subset as the test set, which implies that one less subset was used for training. However, as demonstrated, the tagging accuracy, the precision and recall, and the f-score, improved significantly, with almost all the error rates again cut by more than 50%. The results are shown in FIG. 5.

Figure 6:
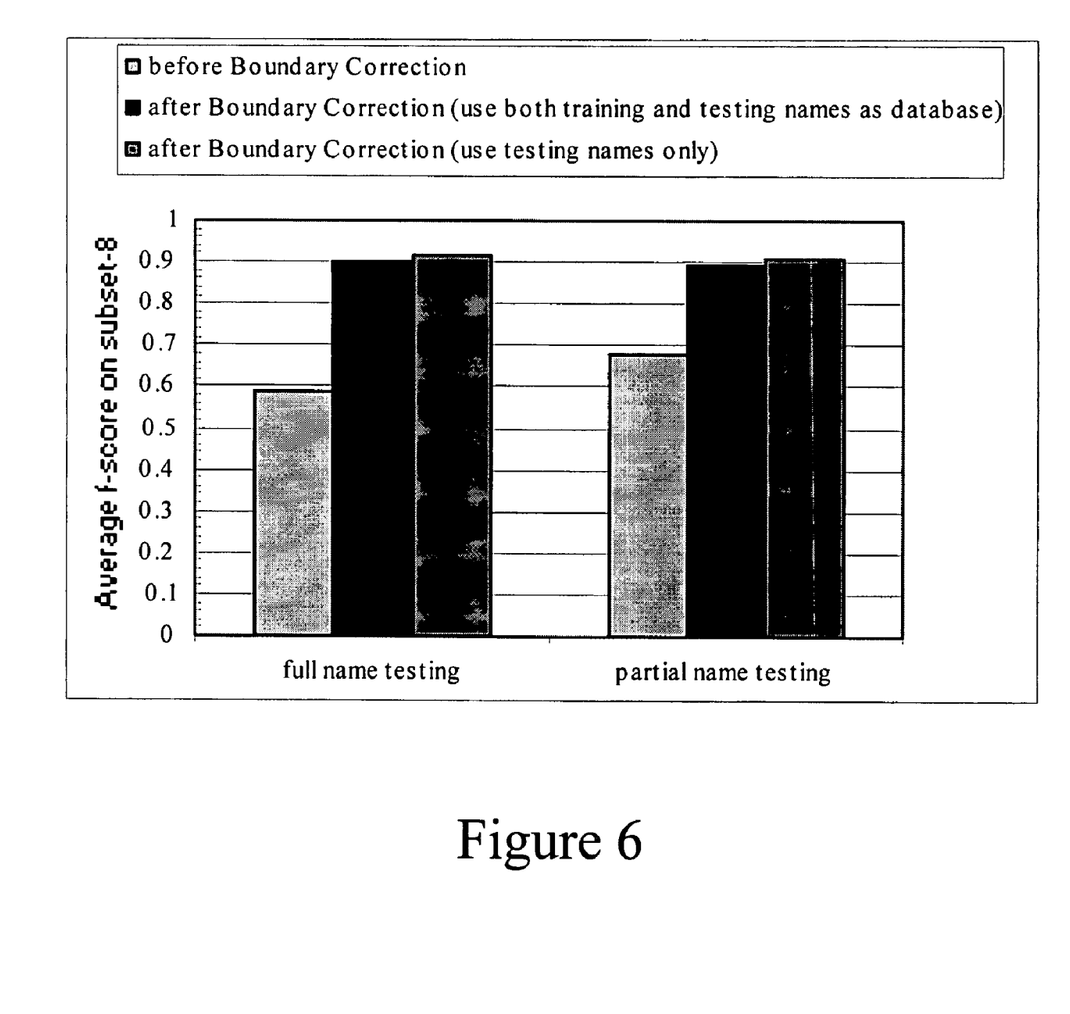
FIG. 6 shows exemplary test results on separate training and testing names.

One last set of experiments was performed to see the effect if the proper name list in the test data is not included in the training data. The memory-based baseline may have the undesired feature of not having access to the proper name list. However, in practice, a model may be trained and packaged, and the available proper name list may not be integrated into the model in real time. So about 20% of both song names and album names may be randomly selected as testing names, and the rest are used as training names. They were permuted in the template sentences separately. Experiments were performed on both full testing names and partial testing names using 8 subsets. The effect of using training names as part of the database in the exemplary boundary correction method in testing was also examined. As can be seen from FIG. 6, the results with and without the boundary-correction method have once again show a significant improvement with the error rates cut by more than half, and the result with training names in the test name list under-performed slightly than the one without training names in the test name list. This may be due to the interference of the training names to the testing names.

Also, the exemplary boundary-correction method may improve both recall and precision by a large amount, which is in contrast with the results reported by Andrei Mikheev, Claire Grover, and Marc Moens, in Description of the LTG System Used for MUC-7, Proceedings of MUC-7, 1998, where the addition of new steps in the pipeline of proper name recognition may have improved the recall but degraded the precision.

Error analysis was performed on the tagging results by applying both the memory-based method and the exemplary boundary-correction method with the 4-subsets and with the same song/album name lists for both training and testing. This is because all different subsets have similar tagging accuracies, and the 4-subsets have the biggest test data set with a total of 1983 errors.

About 67% of all errors were caused by the confusion between partial proper names and the regular words that are in the name database and also occur in locations where the proper names may occur. In the example "Play/O the/O song/O now/I-songname", "now" is labeled as part of a proper name in "here and now". However, in the test set, it is labeled as a normal temporal word.

Another set of errors was caused by the confusion between song names and album names. This accounts for about 16.6% of the errors. An album name may take the name of one of the song names in the album. While some examples show that there are indeed confusable instances such as "Play/O slave/I-songname love/I-songname", other examples show that contextual clues or long distance dependency may help in reducing this type of error. For example, "Does/O this/O album/O have/O made/I-albumname England/I-albumname" may be correctable.

The above two types of errors happen at the baseline system, i.e., the memory-based method. The third and last major set of errors was caused by the exemplary boundary-correction method. The exemplary boundary-correction method occasionally over-corrects boundary words when the boundary words of a partial proper name happen to be part of the corresponding full proper name. For example, the utterance "Does this album have nothing" was correctly tagged by the memory-based method as "Does/O this/O album/O have/O nothing/I-songname". However, it was over-corrected by the exemplary boundary-correction method as "Does/O this/O album/O have/I-songname nothing/I-songname" since there is a song name "have nothing" in the song name list. This type of errors accounts for 9.2%.

In summary, the three major types of errors account for a little more than 93% of the total errors. Besides the task differences, the way of using the proper name database may also have significant effect on the performance results. The work reported in Conference on Computational Natural Language Learning (CoNLL) uses features derived from the proper name lists, while in this work heuristics are used for matching.

In the preceding specification, the present invention has been described with reference to specific example embodiments thereof. It will, however, be evident that various modifications and changes may be made thereunto without departing from the broader spirit and scope of the present invention as set forth in the claims that follow. In particular, the exemplary boundary correction method described herein may be combined with other named entity classifiers, including, for example, a hidden Markov model (HMM) classifier or a decision tree classifier. The specification and drawings are accordingly to be regarded in an illustrative rather than restrictive sense.

What is claimed is:

1. A method of proper name recognition for interpretation of lexical user input and by a system configured to respond to the lexical user input, the method comprising:

classifying each word of a word string containing a plurality of words with a tag indicating one of a proper named entity category and a non-named entity category, wherein consecutive words that are tagged as belonging to the same proper named entity category are grouped to form partial proper names; and correcting the tag of a word of the word string;

wherein the correcting includes:

forming a pool of candidate full names selected from a full name database by selecting those full names that best match a given partial proper name, each of at least a subset of the candidate full names including a respective group of words;

changing the tag of a boundary word of the given partial proper name to indicate a non-named entity category if the boundary word does not exist in the pool of candidate full names;

examining a neighboring word of the given partial proper name; and assigning the neighboring word of the given partial proper name to the named entity category if the neighboring word occurs in the candidate full name with the same ordering.

2. The method of claim 1, wherein the tag corresponds to a position relative to a named entity of the proper name entity category.

3. The method of claim 2, wherein the tag is selected from the IOB tag set.

4. The method of claim 1, wherein the proper named entity category includes two named entities.

5. The method of claim 1, wherein each word is classified using a memory-based named entity classifier.

6. The method of claim 1, wherein each word is classified using a maximum entropy based classifier.

7. The method of claim 1, wherein each word is classified using a memory-based learning classifier and a maximum entropy based classifier.

8. The method of claim 1, wherein each word is classified using a memory-based named entity classifier and a maximum entropy based classifier.

9. A method of proper name recognition for interpretation of lexical user input and by a system configured to respond to the lexical user input, comprising:
classifying each word of a word string containing a plurality of words with a tag indicating one of a proper named entity category and a non-named entity category, wherein consecutive words that are tagged as belonging to the same proper named entity category are grouped to form partial proper names; and
correcting the tag of a word of the word string;
wherein the correcting includes:
forming a pool of candidate full names that each has a maximum number of words occurring in a given partial proper name, wherein an order of matched words of the candidate full names is the same as that of the partial proper name, and wherein the pool of candidate full names are selected from a full name database;
removing a candidate full name from the pool if when one or more inner words in the given partial proper name is removed the resulting partial proper name is a substring in the candidate full name;
changing the tag of a boundary word of the partial proper name to the non-named entity category tag if the boundary word does not exist in the full name pool;
examining a neighboring word of the partial proper name; and
assigning the neighboring word to the partial proper name if the neighboring word occurs in the candidate full name and with the same ordering.

10. The method of claim 9, further comprising:
removing a candidate full name from the pool if matching part of speech tags of the candidate full name are all non-content words, unless all of the part of speech tabs in the candidate full name are non-content words.

11. A system for proper name recognition, comprising:
a database including full proper names; and
a processor configured to:
perform a baseline named entity classifier function to assign a named entity tag to each word of a word string containing a plurality of words, wherein consecutive words that have the same named entity tag are grouped to form partial proper names; and
perform a correction function to correct the named entity tag of a word of the word string;

wherein, for the correction function, the processor is configured to:
form from the database a pool of candidate full names by selecting those full names that best match a given partial proper name, each of at least a subset of the candidate full names including a respective group of words;
change the tag of a boundary word of the given partial proper name to indicate a non-named entity category if the boundary word does not exist in the pool of candidate full names;
examine a neighboring word of the given partial proper name; and
assign the neighboring word of the given partial proper name to the named entity category if the neighboring word occurs in the candidate full name with the same ordering.

12. The system of claim 11, wherein the baseline named entity classifier includes a memory-based learning classifier.

13. The system of claim 11, wherein the named entity classifier includes a maximum entropy based classifier.

14. The system of claim 11, wherein the named entity classifier includes a memory-based learning classifier and a maximum entropy based classifier.

15. The system of claim 11, wherein the named entity classifier is configured to perform IOB tagging.

16. A processing arrangement to perform proper name recognition, comprising:
an input arrangement to receive a word string containing a plurality of words;
a memory storing:
a first set of instructions to assign a named entity tag to each word of the word string, wherein consecutive words that have the same named entity tag are grouped to form partial proper names; and
a second set of instructions to correct the named entity tag of a boundary word of the word string;
a central processing unit to execute the first and second set of instructions; and
an output arrangement to output a result of the executed instructions;
wherein the correcting includes:
forming a pool of candidate full names selected from a full name database by selecting those full names that best match a given partial proper name, each of at least a subset of the candidate full names including a respective group of words;
changing the tag of a boundary word of the given partial proper name to indicate a non-named entity category if the boundary word does not exist in the pool of candidate full names;
examining a neighboring word of the given partial proper name; and
assigning the neighboring word of the given partial proper name to the named entity category if the neighboring word occurs in the candidate full name with the same ordering.

17. A storage medium having a set of instructions executable by a processor to perform the following:
classifying each word of a word string containing a plurality of words with a tag indicating one of a proper name entity category and a non-named entity category, wherein consecutive words that are tagged as belonging to the same proper named entity category are grouped to form partial proper names; and
correcting the tag of a boundary word of the word string;
wherein the correcting includes:

forming a pool of candidate full names selected from a full name database by selecting those full names that best match a given partial proper name, each of at least a subset of the candidate full names including a respective group of words;

changing the tag of a boundary word of the given partial proper name to indicate a non-named entity category if the boundary word does not exist in the pool of candidate full names;

examining a neighboring word of the given partial proper name; and assigning the neighboring word of the given partial proper name to the named entity category if the neighboring word occurs in the candidate full name with the same ordering.

18. A storage medium having a set of instructions executable by a processor to perform the following:

classifying each word of a word string containing a plurality of words with a tag indicating one of a proper name entity category and a non-named entity category, wherein consecutive words that are tagged as belonging to the same proper named entity category are grouped to form partial proper names; and correcting the tag of a boundary word of the word string; wherein the correcting includes:

forming a pool of candidate full names that each has a maximum number of words occurring in a given partial proper name, wherein an order of matched words of the candidate full names is the same as that of the partial proper name, and wherein the pool of candidate full names are selected from a full name database;

removing a candidate full name from the pool if when one or more inner words in the given partial proper name is removed the resulting partial proper name is a substring in the candidate full name;

removing a candidate full name from the pool if matching part of speech tags of the candidate full name are all non-content words, unless all of the part of speech tabs in the candidate full name are non-content words;

changing a tag of a boundary word of the partial proper name to the non-named entity category tag if the boundary word does not exist in the full name pool;

examining a neighboring word of the partial proper name; and assigning the neighboring word to the partial proper name if the neighboring word occurs in the candidate full name and with the same ordering.

19. A method of proper name recognition for interpretation of lexical user input and by a system configured to respond to the lexical user input, comprising:

classifying each word of a word string containing a plurality of words with a tag indicating one of a proper named entity category and a non-named entity category; and correcting the tag of a word of the word string;

wherein the correcting includes:

forming a pool of candidate full names selected from a full name database by selecting those full names that best match a sequence of consecutive words of the word string, each of the consecutive words having been tagged as belonging to the same proper named entity category, each of at least a subset of the candidate full names including a respective group of words;

determining which of the candidate full names is a best candidate; and linking the sequence of words to the determined best candidate.

20. A method of proper name recognition for interpreting a user's speech input by a speech recognition system, the method comprising:

classifying each word of a word string containing a plurality of words with a tag indicating whether the respective word is of a proper named entity category, wherein a subset of the word string includes consecutive words that have all been tagged during the classifying as being of the same proper named entity category and includes boundaries formed by edge words of the subset that are not surrounded by words tagged as being of the same proper named entity category; and performing a boundary correction procedure that includes:

determining whether the boundaries are correct by forming a pool of candidate full names selected from a full name database by selecting those full names that best match the subset and comparing the subset to the pool of candidate full names, each of at least a subset of the candidate full names including a respective group of words; and if it is determined that the boundaries are incorrect, correcting the boundaries by at least one of:

(a) retagging at least one of the edge words; and (b) retagging at least one word that is external to the subset and immediately adjacent one of the edge words.

* * * * *